(12) United States Patent
Haruta et al.

(10) Patent No.: US 8,692,914 B2
(45) Date of Patent: Apr. 8, 2014

(54) IMAGE SENSOR

(75) Inventors: Tsutomu Haruta, Kanagawa (JP); Eiji Makino, Kanagawa (JP); Takeshi Yamaguchi, Fukuoka (JP); Tatsuya Matsumura, Fukuoka (JP)

(73) Assignee: Sony Corporation, Tokyo (JP)

( * ) Notice: Subject to any disclaimer, the term of this patent is extended or adjusted under 35 U.S.C. 154(b) by 297 days.

(21) Appl. No.: 12/120,452

(22) Filed: May 14, 2008

(65) Prior Publication Data
US 2008/0284903 A1 Nov. 20, 2008

(30) Foreign Application Priority Data
May 18, 2007 (JP) ................. 2007-133385

(51) Int. Cl.
 *H04N 5/335* (2011.01)
 *H04N 5/232* (2006.01)
 *H04N 5/235* (2006.01)
 *H04N 5/222* (2006.01)

(52) U.S. Cl.
USPC ........... 348/294; 348/296; 348/345; 348/362; 348/371

(58) Field of Classification Search
USPC ......... 348/294, 296, 297, 298, 302, 307, 308, 348/345, 362
See application file for complete search history.

(56) References Cited

U.S. PATENT DOCUMENTS

| 4,338,514 | A | * | 7/1982 | Bixby | 250/201.1 |
| 6,961,091 | B1 | * | 11/2005 | Kubo | 348/370 |
| 2004/0212723 | A1 | * | 10/2004 | Lin | 348/362 |
| 2006/0181634 | A1 | * | 8/2006 | Onozawa | 348/345 |
| 2006/0268145 | A1 | * | 11/2006 | Moon et al. | 348/340 |
| 2008/0043132 | A1 | * | 2/2008 | Gunter | 348/333.01 |

FOREIGN PATENT DOCUMENTS

| JP | 10-26697 | 5/1998 |
| JP | 2002-010108 | 1/2002 |
| JP | 2007-060137 | 3/2007 |
| JP | 2007-104728 | 4/2007 |
| JP | 2006-279652 | 5/2008 |

OTHER PUBLICATIONS

Japanese Office Action issued on Feb. 17, 2007.

* cited by examiner

*Primary Examiner* — Twyler Haskins
*Assistant Examiner* — Peter Chon
(74) *Attorney, Agent, or Firm* — Dentons US LLP

(57) ABSTRACT

An image sensor includes a solid-state image pickup device, an optical system, and a flash. The solid-state image pickup device has an electronic shutter function of outputting accumulated signal charges at a timing corresponding to a shutter speed. The optical system collects incident light to an image pickup area of the solid-state image pickup device. The flash irradiates light to an object to be photographed by the solid-state image pickup device. The solid-state image pickup device includes a pulse generator circuit for generating one or more of an electronic shutter pulse for controlling an accumulation time of signal charges by using the electronic shutter function, an optical system movement pulse for controlling movement of the optical system, and a flash pulse for controlling an emission timing of the flash.

3 Claims, 5 Drawing Sheets

IMAGE SENSOR

CROSS-REFERENCE TO RELATED APPLICATIONS

The present application claims benefit of priority of Japanese patent Application No. 2007-133385 filed in the Japanese Patent Office on May 18, 2007, the entire disclosure of which is incorporated herein by reference.

BACKGROUND OF THE INVENTION

1. Field of the Invention

The present invention relates to an image sensor. More particularly, the present invention relates to an image sensor having an electronic shutter function, an autofocus function, and a flash function.

2. Description of Related Art

FIG. 3A is a schematic diagram illustrating a known image sensor. The image sensor 101 shown herein is equipped with a lens 110 for collecting incident light, a mechanical shutter 111 for passing the light collected by the lens 110 only for a predetermined time period, a complementary metal oxide semiconductor (CMOS) type solid-state image pickup device 112 for taking an object image inputted via the lens 110 and mechanical shutter 111, and a control unit 113 for controlling the lens 110, mechanical shutter 111, and CMOS type solid-state image pickup device 112. Light coming from an object becomes incident upon the CMOS type solid-state image pickup device 112 via the lens 110 and mechanical shutter 111.

As shown in FIG. 4, the CMOS type solid-state image pickup device 112 includes a number of pixels disposed in a matrix shape, a vertical scan circuit 54 for sequentially selecting each row or line of a pixel unit 52 (hereinafter referred to as "line"), a horizontal scan circuit 60 for sequentially scanning each column of the pixel unit 52 (hereinafter referred to as "column") and an output circuit 61 for outputting a signal (e.g., refer to Japanese Unexamined Patent Application Publication No. HEI-10-126697).

The vertical scan circuit 54 and horizontal scan circuit 60 are each composed of, for example, a shift register, and configured for sequentially generating and supplying each vertical scan pulse and each horizontal scan pulse to each line and column.

To read an image signal accumulated in each pixel, the vertical scan circuit 54 applies a pulse signal to a corresponding vertical select line 53 to make all pixel transistors 51 of one line conductive and read image signals in photodetectors 50 to the respective vertical signal lines 55. The image signals read by the vertical signal lines 55 are supplied to a circuit such as a correlation double sampling circuit (CDS) 56 for removing an offset signal of each pixel.

The horizontal scan circuit 60 applies a pulse signal to a transistor 57 connected to each vertical signal line 55 via a horizontal select line 59 to make the transistor 57 conductive. The image signal with the offset signal removed by CDS 56 is read to a horizontal signal line 58, converted into a voltage signal by the output circuit 61, and then the voltage signal is outputted to outside.

Many recent image sensors have a built-in autofocus function for automatically focusing an object. Generally, the autofocus function is achieved by detecting a contrast of a photographed image in accordance with high frequency components of an image signal and judging an in-focus state if the contrast is high. For example, data called a focus evaluation value obtained by integrating high frequency components of an image signal existing in a predetermined set area is generated, and a focus lens is moved so as to make maximum the focus evaluation value.

In order to provide an autofocus of this type, it is necessary to properly move the lens 111. Movement control of the lens is performed by the control unit 113.

When the image sensor takes an image of an object having a low illuminance, a flash is used to irradiate light to the object to supplement a quantity of light. An emission timing of the flash is controlled by the control unit 113.

Furthermore, the image sensor is incorporated into an electronic shutter so that an imaging result without blur can be obtained by controlling an exposure through the control of an accumulation time of signal charges in the CMOS type solid-state image pickup device even when an object with a fast movement is photographed. This electronic shutter function is controlled by the control unit 113.

Many image sensors use the mechanical shutter 111. By using the mechanical shutter, it becomes possible to almost perfectly shut incident light upon the image sensor and to suppress generation of noises to be caused by unintended incident light.

The open/close operation of the mechanical shutter 111 is controlled by the control unit 113.

When the control unit 113 controls the movement of lens, a flash emission timing, an electronic shutter function, and a mechanical shutter open/close operation, the control is performed based on control signals (more specifically, a lens movement control signal, an emission timing control signal, an electronic shutter function control signal and a mechanical shutter open/close operation control signal). Each control signal is generated in accordance with a reference timing generated by a digital signal processor (DSP) in response to an image signal from the CMOS type solid-state image pickup device.

Namely, as shown in FIG. 3B, an image signal is transferred from the CMOS type solid-state image pickup device 112 to DSP 114 which in turn generates the reference timing and generates a control signal in accordance to the reference timing. The control signal is outputted to each control unit 115 (more specifically, a VCM driver circuit for controlling the movement of lens, a flash mechanism for controlling the flash function, a mechanical shutter mechanism for controlling an open/close operation of the mechanical shutter and the like).

In Japanese Unexamined Patent Application Publication No. 2006-279652, as shown in FIG. 5, an image signal is supplied from a CMOS type solid-state image pickup device 112 to DSP 114 which in turn generates a reference timing, generates a control signal in accordance with the reference timing, and thereafter outputs control signals to an imaging driver unit 115a, an iris driver unit 115b and a lens driver unit 115c.

SUMMARY OF THE INVENTION

However, since DSP of each image sensor described above generates the reference timing in accordance with the image signal outputted from the solid-state image pickup device, timing noises are likely to be generated on the reference timing. Namely, there is a possibility of containing noises in the image signal when the image signal is outputted from the solid-state image pickup device to DSP. Since the reference timing is generated by DSP in accordance with the image signal having a high possibility of containing the noises, the generated reference timing has also a high possibility of containing the noises. As a result, there is a high possibility of containing the noises in each control signal.

From the viewpoint of designs, semiconductor devices such as an image sensor chip and a DSP are often designed and manufactured independently. Generally, an imaging (exposure in an image sensor) function has a priority over other camera functions, and a timing control for a flash and an optical system such as AF and AE is synchronized. The timing control is often difficult to synchronize if the image sensor and DSP are designed and manufactured independently as described above. If the synchronization is not established and the timing is out of synchronization, an image quality may be degraded.

The present invention addresses the above-identified issues and provides an image sensor capable of reducing noises in a control signal and alleviating timing-off.

In accordance with an embodiment of the present invention, there is provided an image sensor which includes a solid-state image pickup device having an electronic shutter function of outputting accumulated signal charges at a timing corresponding to a shutter speed, an optical system for collecting incident light to an image pickup area of the solid-state image pickup device, and a flash for irradiating light to an object to be photographed by the solid-state image pickup device. The solid-state image pickup device includes a pulse generator circuit for generating one or more of an electronic shutter pulse for controlling an accumulation time of signal charges by using the electronic shutter function, an optical system movement pulse for controlling movement of the optical system, and a flash pulse for controlling an emission timing of the flash.

The solid-state image pickup device according to an embodiment of the present invention includes the pulse generator circuit for generating one or more of an electronic shutter pulse for controlling an accumulation time of signal charges by using the electronic shutter function, an optical system movement pulse for controlling movement of the optical system, and a flash pulse for controlling an emission timing of the flash. As a result, noises in a pulse (specifically, the reference timing of the control signal) generated by the pulse generator circuit can be suppressed.

Namely, if the image signal is outputted from the solid-state image pickup device to an external circuit (e.g., DSP) and the external circuit generates the reference timing, noises are contained in the image signal during a period while the image signal reaches from the solid-state image pickup device to the external circuit which generates the reference timing. Accordingly, there is a possibility that noises are contained in the generated reference timing. In contrast, according to an embodiment of the present invention, the reference timing is generated in the solid-state image pickup device without outputting the image signal from the solid-state image pickup device to the external circuit, so that noises in the reference timing can be suppressed.

The "one or more of an electronic shutter pulse for controlling an accumulation time of signal charges by using the electronic shutter function, an optical system movement pulse for controlling a movement of the optical system, and a flash pulse for controlling an emission timing of the flash" means that the pulse generator circuit of the solid-state image pickup device may generate any one or two pulses of the reference timings including the electronic shutter pulse, optical system movement pulse and flash pulse. However, if the pulse generator circuit of the solid-state image pickup device generates all pulses of the reference timings, it is possible to suppress noises in all pulses of the reference timings. It is therefore preferable that the pulse generator circuit of the solid-state image pickup device generates all pulses of the reference timings including the electronic shutter pulse, optical system movement pulse and flash pulse.

Further, the image sensor may include a mechanical shutter for passing incident light collected by the optical system only for a predetermined time period. According to the image sensor, noises in a mechanical shutter pulse of the reference timing can be suppressed, if the pulse generator circuit of the solid-state image pickup device generates a mechanical shutter pulse for controlling a time lapsed until the incident light passes through the mechanical shutter.

The image sensor according to an embodiment of the present invention can reduce timing noises of the reference timing in each control signal and can suppress an image quality from being degraded otherwise to be caused by noises of the reference timing.

The above summary of the present invention is not intended to describe each illustrated embodiment or every implementation of the present invention. The figures and the detailed description which follow more particularly exemplify these embodiments.

DETAILED DESCRIPTION OF EMBODIMENTS

In order to help understand the present invention, an embodiment of the present invention will be described with reference to the accompanying drawings.

Figure 1A:
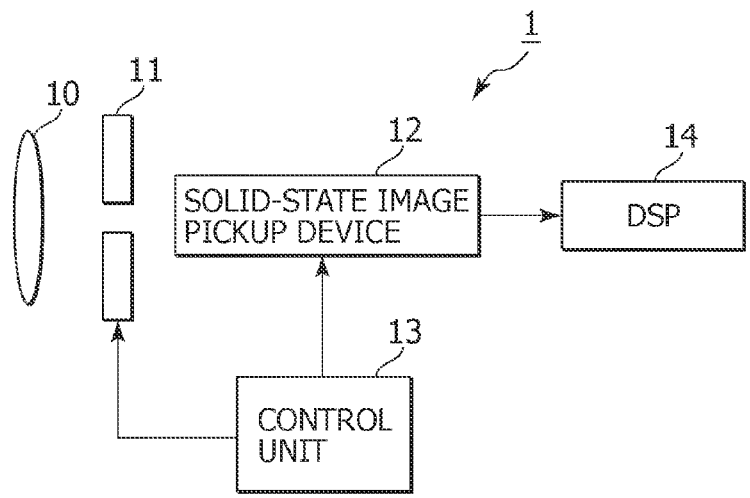
FIGS. 1A and 1B are schematic diagrams for explaining an image sensor to which an embodiment of the present invention is applied.

FIG. 1A is a schematic diagram for explaining an image sensor to which an embodiment of the present invention is applied. The image sensor 1 shown herein includes, similar to the known image sensor, a lens 10 for collecting incident light, a mechanical shutter 11 for passing light collected by the lens 10 only for a predetermined time period, a CMOS type solid-state image pickup device 12 for taking an object image inputted via the lens 10 and mechanical shutter 11, and a control unit 13 for controlling the lens 10, mechanical shutter 11 and CMOS type solid-state image pickup device 12. Light coming from an object becomes incident upon the CMOS type solid-state image pickup device 12 via the lens 10 and mechanical shutter 11.

Figure 4:
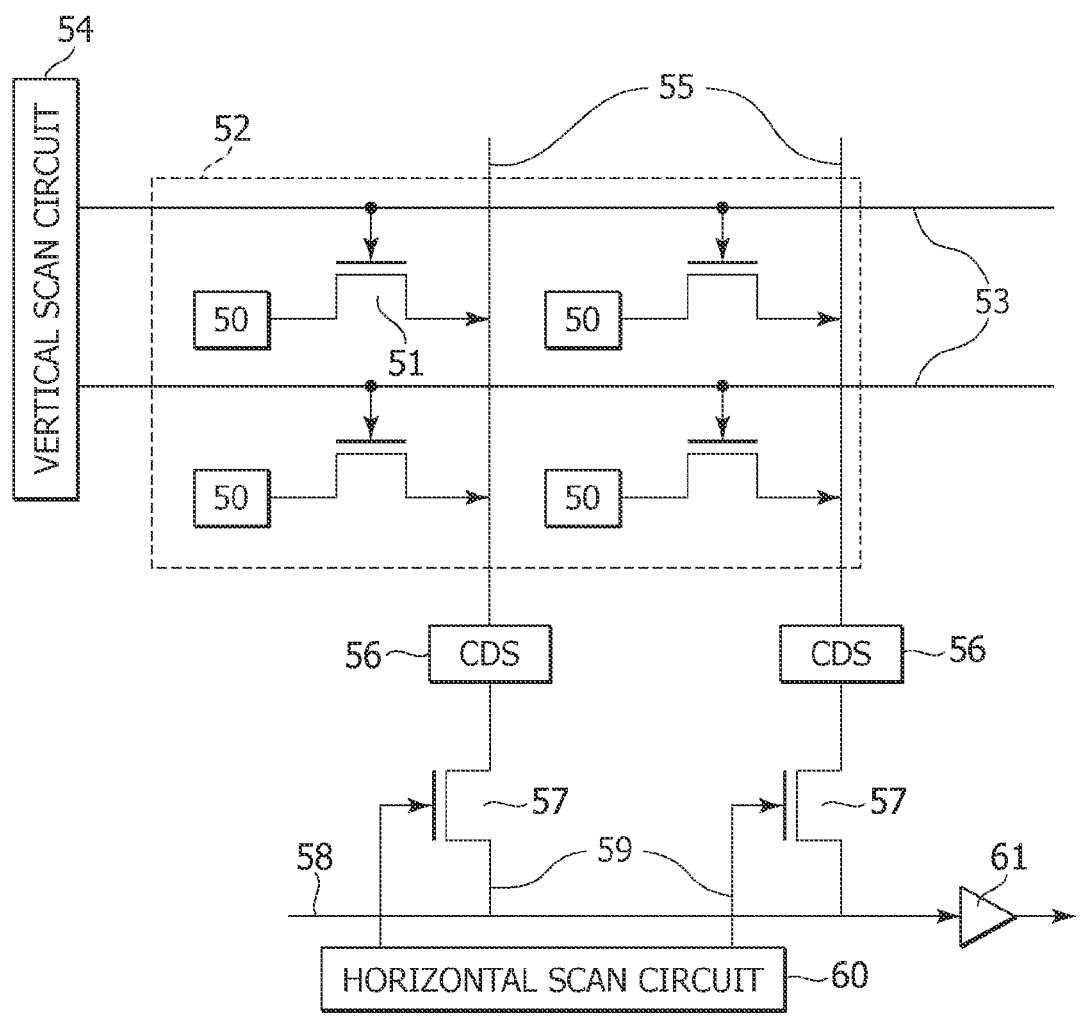
FIG. 4 is a schematic diagram for explaining a CMOS type solid-state image pickup device.
Figure 5:
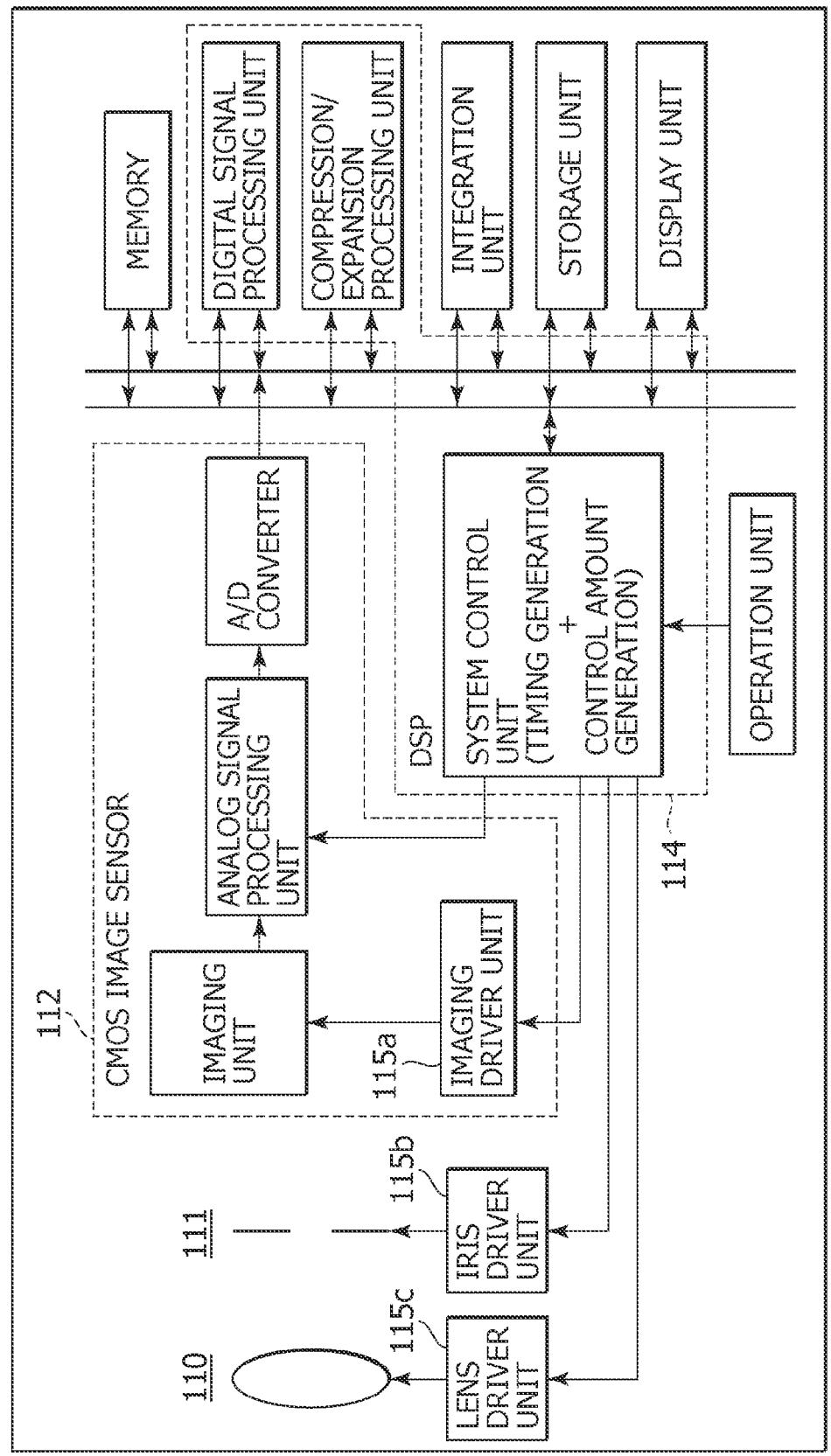
FIG. 5 is a schematic diagram for explaining a known image sensor.

Similar to the known CMOS type solid-state image pickup device (refer to FIG. 4), the CMOS type solid-state image pickup device 12 includes a number of pixels disposed in a matrix shape, a vertical scan circuit 54 for sequentially selecting each line of a pixel unit 52, a horizontal scan circuit 60 for sequentially scanning each column of the pixel unit and an output circuit 61 for outputting a signal. The vertical scan circuit 54 and horizontal scan circuit 60 are each composed of, for example, a shift register, and configured for sequentially generating and supplying each vertical scan pulse and each horizontal scan pulse to each line and column. When an image signal accumulated in each pixel is to be read, the vertical scan circuit 54 applies a pulse signal to a corresponding vertical select line 53 to make all pixel transistors 51 of one line conductive and read image signals in photodetectors 50 to respective vertical signal lines 55. The image signals read to the vertical signal lines 55 are supplied to a circuit such as a CDS 56 for removing an offset signal of each pixel. The horizontal scan circuit 60 applies a pulse signal to a transistor 57 connected to each vertical signal line 55 via a horizontal select line 59 to make the transistor 57 conductive. The image signal with the offset signal removed by CDS 56 is read to a horizontal signal line 58, converted into a voltage signal by the output circuit 61 and output to outside.

Similar to the above-described known image sensor, the image sensor using an embodiment of the present invention is equipped with an autofocus function. In order to provide autofocus, the movement control of the lens 11 is performed by the control unit 13.

The image sensor further includes a flash function, a mechanical shutter function, and an electronic shutter function. The control unit 13 also controls an emission timing of the flush function, an open/close operation of the mechanical shutter 11 and an electronic shutter function.

When the control unit 13 controls the movement of lens, a flash emission timing, an electronic shutter function, and a mechanical shutter open/close operation, a control signal is used similar to the known image sensor. However, the image sensor adopting an embodiment of the present invention is constructed in such a manner that a reference timing of each control signal is generated by a pulse generator circuit in the CMOS type solid-state image pickup device, whereby each control signal is generated by DSP in accordance with the generated reference timing and image signal.

Figure 1B:
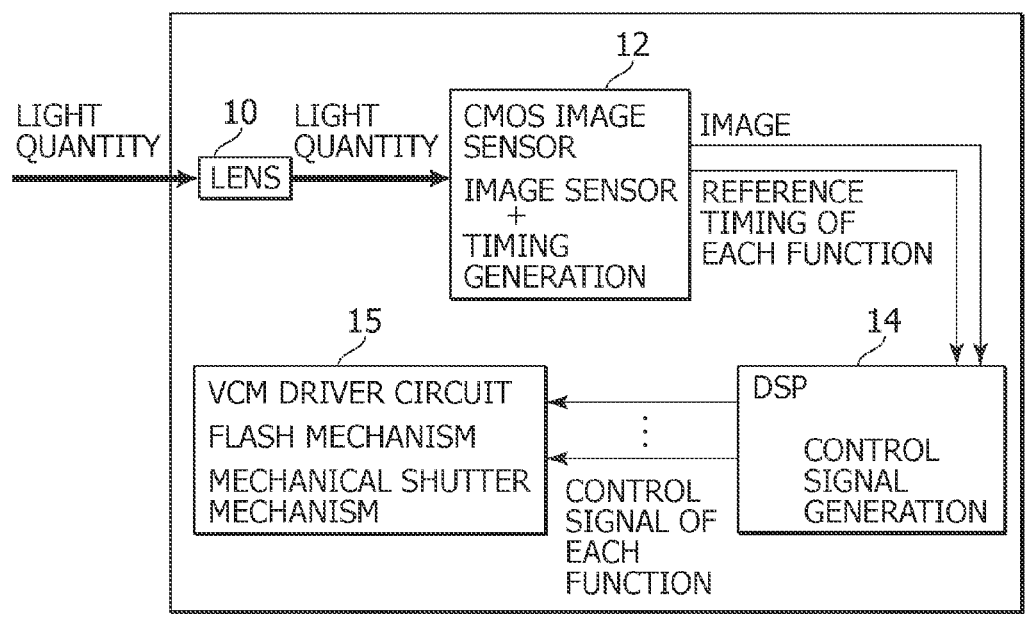

Namely, as shown in FIG. 1B, the image signal and reference signal are transferred from the CMOS solid-state image pickup device 12 to DSP 14 which in turn generates a control signal in accordance with the image signal and reference signal and outputs a control signal to each control unit 15.

Figure 2:
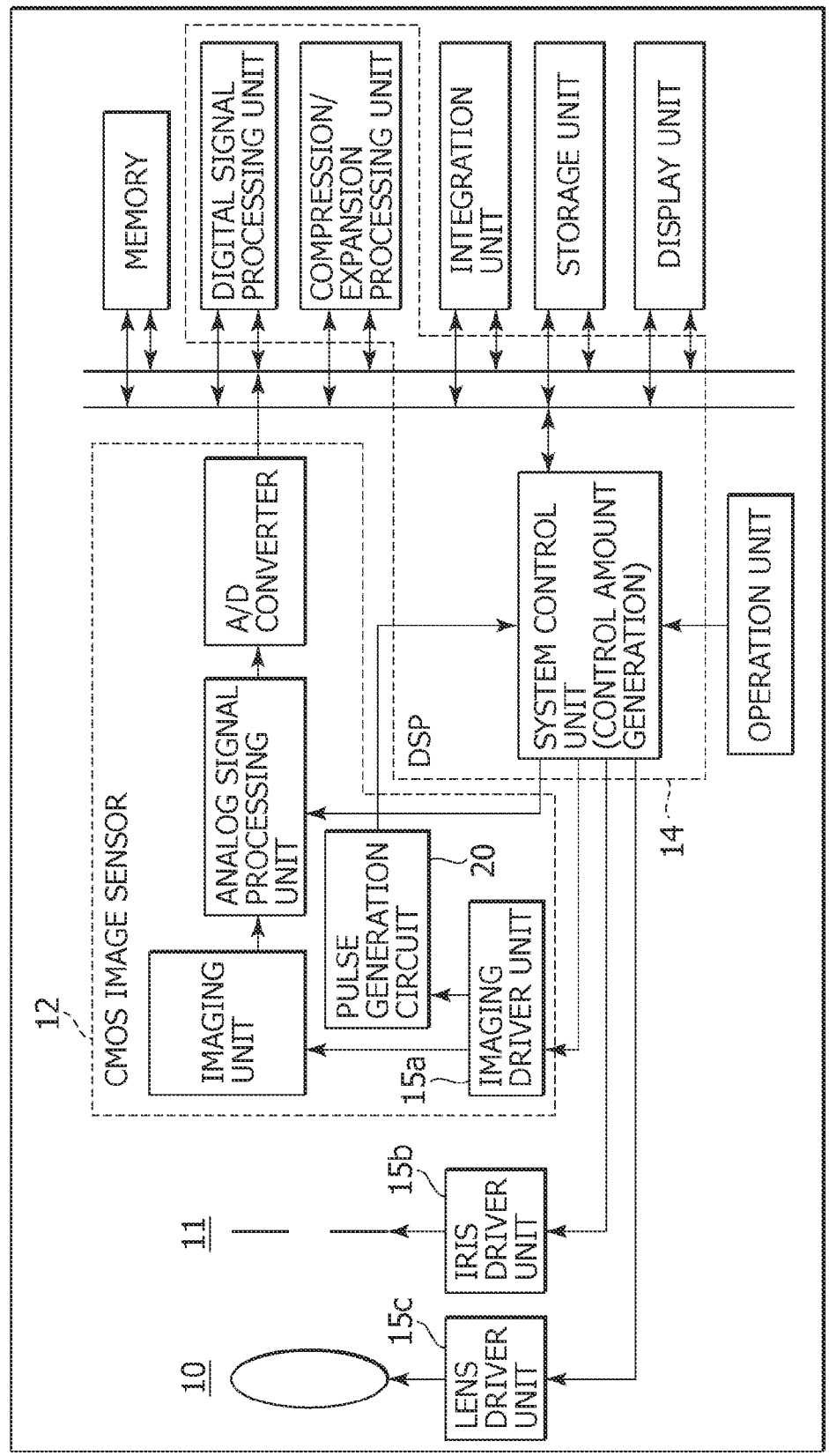
FIG. 2 is a schematic diagram for explaining the image sensor to which an embodiment of the present invention is applied.
Figure 3A:
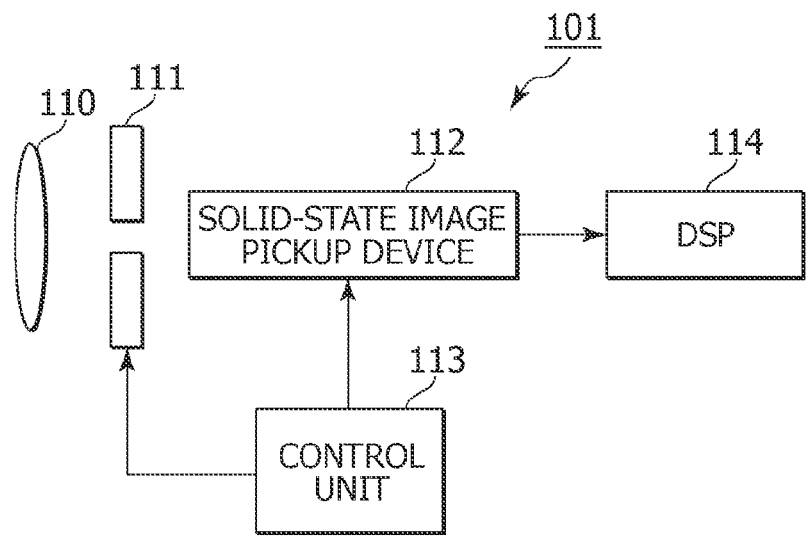
FIGS. 3A and 3B are schematic diagrams for explaining a known image sensor.
Figure 3B:
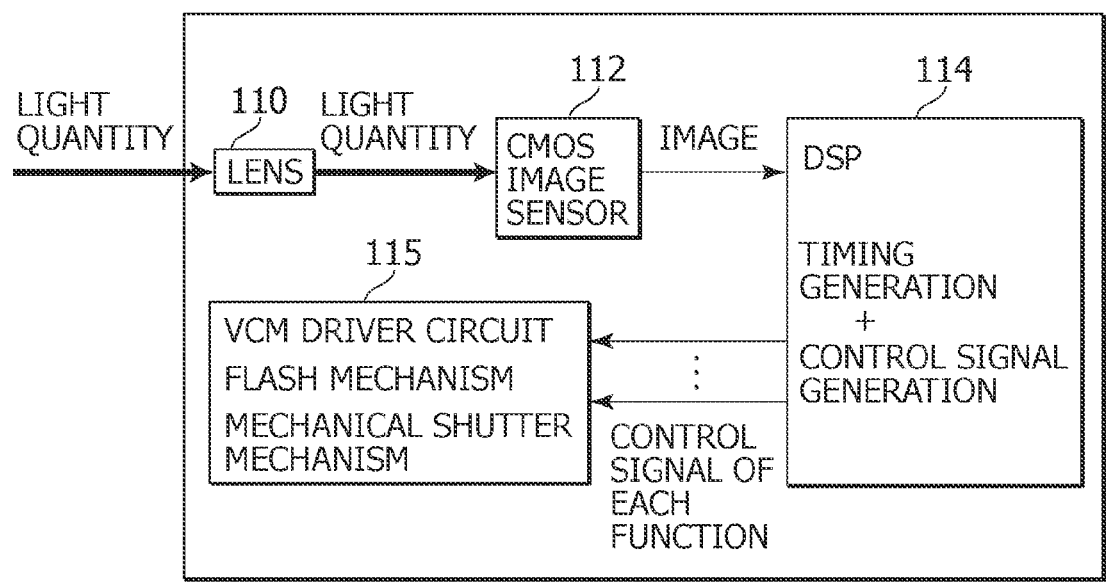

More specifically, as shown in FIG. 2, a pulse generator circuit 20 in the CMOS type solid-state image pickup device 12 generates the reference timing, and the generated reference timing and image signal are supplied to DSP 14. DSP generates a control signal in accordance with the reference timing and image signal, and outputs control signals to an imaging driver unit 15a, an iris driver unit 15b and a lens driver unit 15c.

In the image sensor adopting an embodiment of the present invention, since the reference timing is generated by the pulse generator circuit in the CMOS type solid-state image pickup device, the reference timing does not contain noises so that noises in each control signal generated by DSP in accordance with the reference timing and image signal can be reduced. Also from the same reason, timing control for a flash and an optical system can be synchronized easily. Furthermore, noises in each control signal are suppressed, so that an image quality of the image sensor can be improved.

It should be understood by those skilled in the art that various modifications, combinations, sub-combinations and alternations may occur depending on design requirements and other factors insofar as they are within the scope of the appended claims or equivalents thereof.

What is claimed is:

1. An image sensor comprising:
    a solid-state image pickup device that generates an image signal;
    an optical system that collects incident light and directs the incident light onto an image pickup area of the solid-state image pickup device, the image pickup area being configured to accumulate signal charges in response to the incident light and having an electronic shutter function;
    a mechanical shutter for passing the incident light collected by the optical system only for a predetermined time period; and
    a flash that irradiates light to an object to be photographed by the solid-state image pickup device,
    wherein,
    the solid-state image pickup device includes therein (i) a reference timing pulse generator circuit that generates all of reference timing pulses including an electronic shutter pulse, a mechanical shutter pulse, an optical system movement pulse, and a flash pulse, and (ii) the solid-state image pickup device outputs both the reference timing pulses and the image signal to an external circuit external to the solid-state image pickup device, and
    the external circuit, based on the reference timing pulses from the solid-state image pickup device, generates respective control signals, the external circuit generating (i) a control signal for controlling an accumulation time of signal charges by using the electronic shutter function based on the electronic shutter pulse, (ii) a control signal for controlling a time lapsed until the incident light passes through the mechanical shutter based on the mechanical shutter pulse, (iii) a control signal for controlling movement of the optical system based on the optical system movement pulse, and (iv) a control signal for controlling an emission timing of the flash based on the flash pulse.

2. The image sensor according to claim 1, wherein the external circuit includes a digital signal processor (DSP).

3. A imaging system comprising:
    a solid-state image pickup device that generates an image signal;
    an optical system that collects incident light and directs the incident light onto an image pickup area of the solid-state image pickup device, the image pickup area being configured to accumulate signal charges in response to the incident light and having an electronic shutter function;
    a mechanical shutter for passing the incident light collected by the optical system only for a predetermined time period;
    a flash that irradiates light to an object to be photographed by the solid-state image pickup device; and
    a processor, external to the solid state image pickup device
    wherein,
    the solid-state image pickup device includes therein (i) a reference timing pulse generator circuit that generates all of reference timing pulses including an electronic shutter pulse, a mechanical shutter pulse, an optical system movement pulse, and a flash pulse, and (ii) the solid-state image pickup device outputs both the reference timing pulses and the image signal to the processor, and
    the processor, based on the reference timing pulses from the solid-state image pickup device, generates respective control signals, the processor generating (i) a control signal for controlling an accumulation time of signal charges by using the electronic shutter function based on the electronic shutter pulse, (ii) a control signal for controlling a time lapsed until the incident light passes through the mechanical shutter based on the mechanical shutter pulse, (iii) a control signal for controlling movement of the optical system based on the optical system movement pulse, and (iv) a control signal for controlling an emission timing of the flash based on the flash pulse.

* * * * *